Nov. 9, 1965    J. M. LEACH    3,216,553
TUBULAR CONVEYORS
Filed Sept. 10, 1962    2 Sheets-Sheet 2
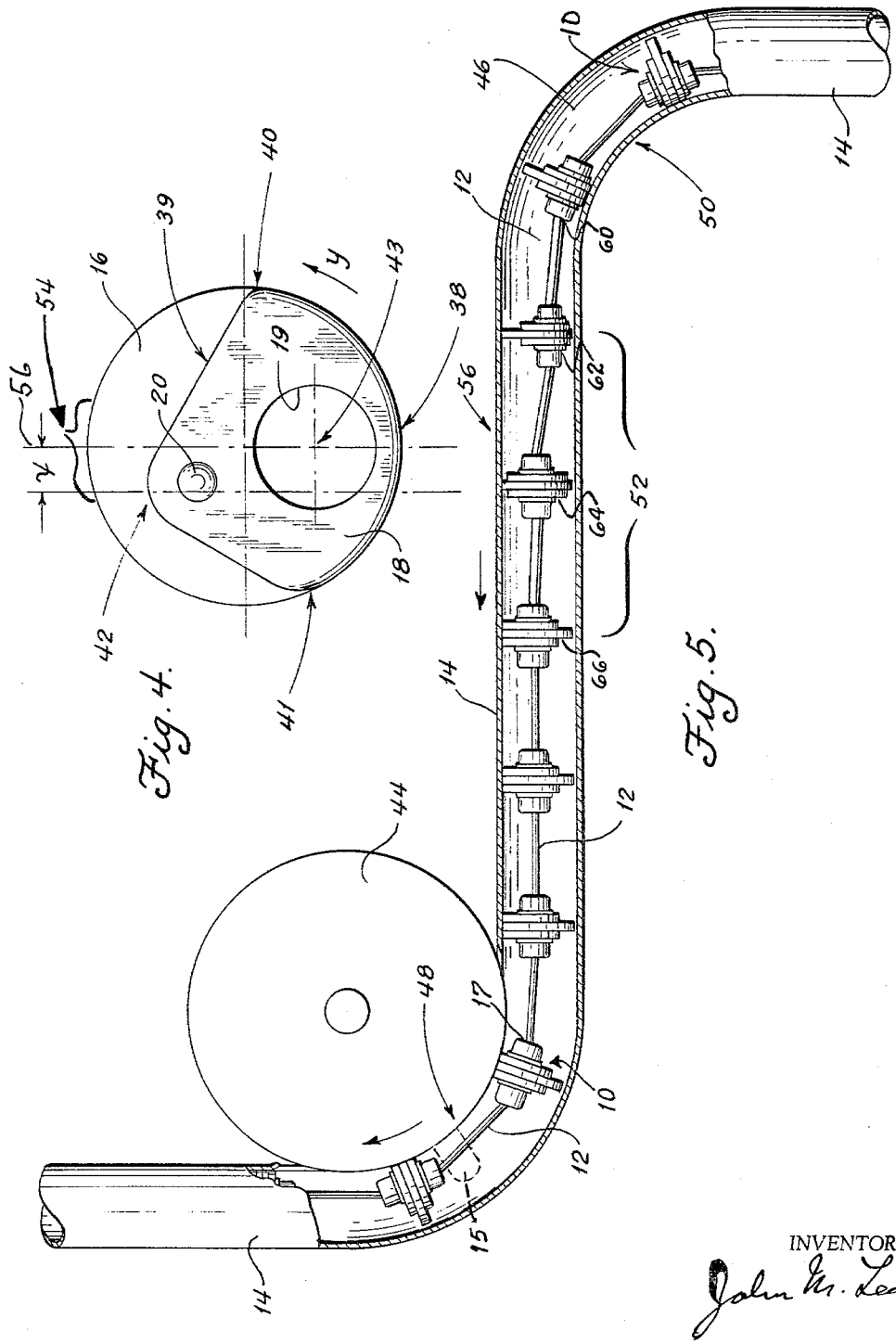

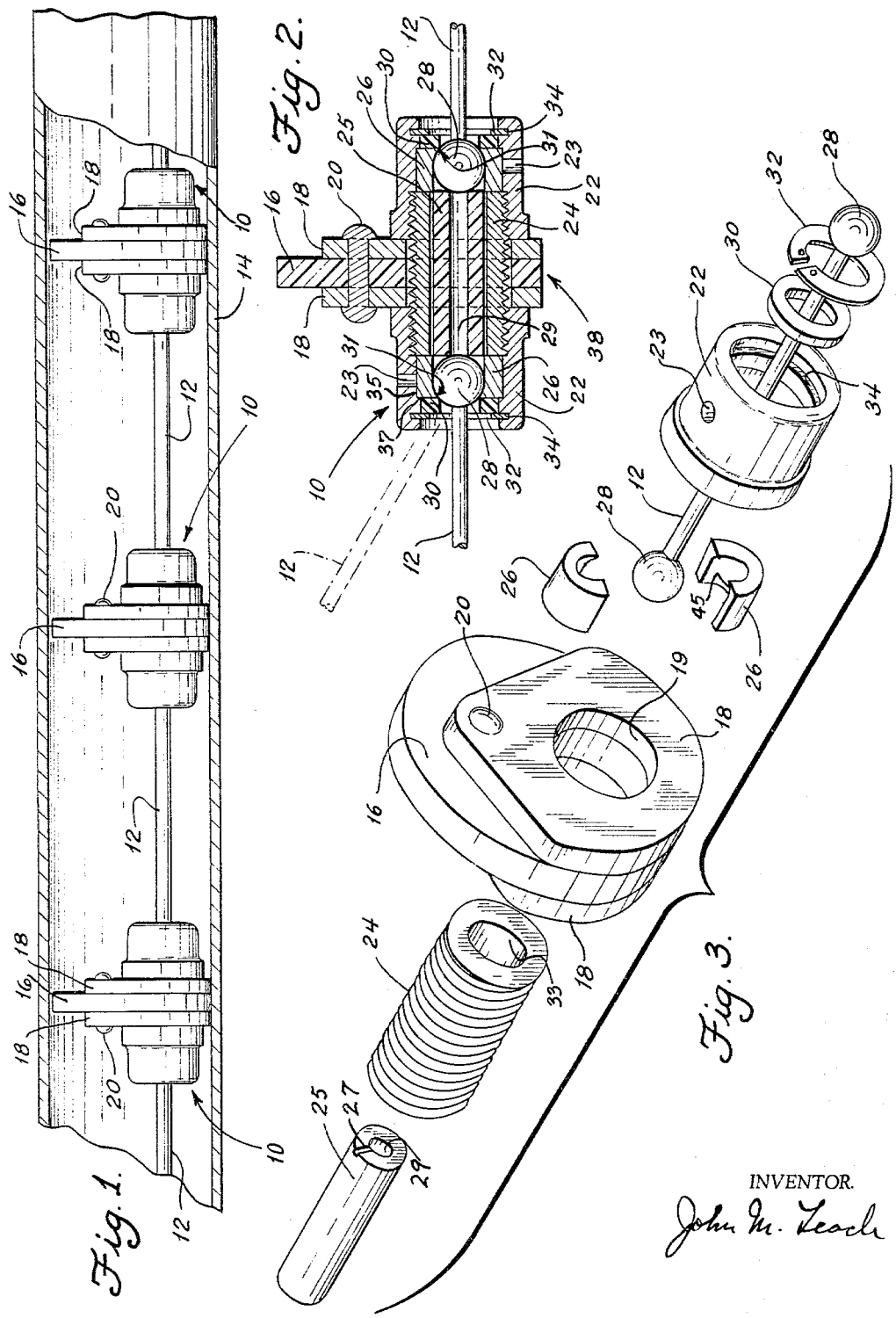

United States Patent Office 3,216,553
Patented Nov. 9, 1965

3,216,553
TUBULAR CONVEYORS
John M. Leach, P.O. Box 350, Port Jefferson, N.Y.
Filed Sept. 10, 1962, Ser. No. 222,330
21 Claims. (Cl. 198—168)

The present invention relates to conveyors. More particularly, it relates to conveyors of the tubular type wherein a series of pushers termed flights propel material along the interior of a tube.

Tubular conveyor flights heretofore have been formed predominantly of materials which caused them to be stiff and unyielding in the direction of movement. This has caused tubular conveyors to be subject to extensive malfunction due to particles lodging between the edge of the flights and the interior wall of the tubing and either causing complete stoppage or greatly increasing the force required to move the flights which created excessive wear and greatly accelerated wear, not only on the flights and tubing wall but also on the linkage between the flights and the drive mechanism.

The flights were not made flexible so as to be capable of yielding when particles became lodged around the edges against the tubing wall because such flexible flights would yield and bypass material to be carried, and, particularly when driving force became high, the flights would yield and scuff along the tubing wall and have a very short wear life. The latter action was particularly troublesome at the turns.

It is an object of the present invention to provide a tubular conveyor having flexible flights which will substantially eliminate stoppages and wear due to lodging of particles and objects between the edges of the flights and the tubing wall.

It is another object of the present invention to provide a tubular conveyor having flexible flights which will not bypass material being carried.

It is a further object of the present invention to provide a tubular conveyor having flexible flights wherein the flexible nature of the flights does not enhance the wear of the flights or any other element of the conveyor.

Tubular conveyors theretofore have employed linkage between the flights which was predominantly either cable or a standard link chain, sometimes modified in some minor respect.

When a cable has been used as the linkage between the flights, relative rotating movement between the flights around the cable has been extremely limited which has seriously restricted the number of direction changes which the conveyor could undergo. Any direction change has caused the lays of the cable to open so as to admit portions of the material being carried and thereby increase the wear on the cable as well as create contamination hazards.

When a chain has been used as the linkage between the flights, relative rotating movement between the flights around the chain has been limited to the small amount of clearance which could be tolerated between the chain pins and side bars. This has restricted the number of direction changes which the conveyor could undergo even more drastically than when a cable was used. Also, the bulky chain has occupied space which has limited the carrying capacity and the numerous bearing points have presented a multitude of wear points which has greatly reduced the life of the conveyor. Furthermore, the open bearing points have made any form of lubrication impossible which has further reduced the active wear life of the conveyor.

In an effort to make the conveyor flight and linkage assembly more flexible, universal joints have been placed in the chain which only served to multiply the large number of wear and contamination points and thereby further reduce the conveyor life and also reduced the strength of the chain.

It is another object of the present invention to provide a tubular conveyor having flexible flights wherein any flight can have unrestricted rotation about the linkage between the flights relative to any other flight.

It is still another object of the present invention to provide a tubular conveyor having flights and connecting linkages in which all bearing areas between the flights and linkages are at all times protected from contact with the material being carried.

It is a further object of the present invention to provide a tubular conveyor having flights and connecting linkages in which all bearing areas in the flights and linkages are lubricated at all times.

It is a still further object of the present invention to provide a tubular conveyor having flights and connecting linkages in which all bearing areas in the flights and linkages are sealed against the penetration of foreign materials and the escape of lubricant at all times. Another object is to provide such a seal wherein all pressure from the exterior tends to tighten and improve the seal.

A still further object of the present invention is to provide a tubular conveyor having flights and connecting linkages wherein the bearing areas between the flights and linkages are positively forced into tight contact at all times, even though the flight-linkage assembly may not be under tension.

Another object of the present invention is to provide a tubular conveyor having flights and linkages between the flights wherein any flight or linkage can be removed or replaced by unscrewing or screwing back only two parts.

Still another object of the present invention is to provide a tubular conveyor having flexible flights wherein the flexible element of the flight is protected by a rigid element.

Yet another object of the present invention is to provide a tubular conveyor having flexible flights eccentrically attached to linkages wherein the shape of the flight causes it to assume a preferred position in the tubing under normal forces set up by the operation of the conveyor.

Other objects and advantages of the present invention will be apparent to those skilled in the art upon reference to the following detailed specification and drawings wherein the same reference characters refer to like parts throughout and in which:

FIG. 1 is a side view of a section of a tubular conveyor with a portion of the tubing wall cut away to show the flights and linkages of the present invention;

FIG. 2 is a vertical cross sectional view of a flight of the present invention showing the internal construction and the attachment between the flight and linkages;

FIG. 3 is an exploded view showing the elements of the flights and linkages of the present invention and the sequence of their assembly;

FIG. 4 is a face view of a pusher element of a flight showing a preferred shape for the stiffening plates; and FIG. 5 is a side view of a section of tubular conveyor including two different types of turns and with a portion of the tubing wall cut away to show the action of the flights and linkages of the present invention on straight runs between reverse turns.

The tubular conveyor of the present invention, referring to FIG. 1, comprises a tube or pipe 14 which at some point (not shown) will have a feed opening or hopper to admit material to be carried to the interior of the tube. At some distant point (not shown) the tube will be provided with a discharge opening to empty out the material being carried.

The material is moved along the tube regardless of whatever direction the tube may take by a series of alternate flights 10 and linkages 12 which are usually connected so as to traverse an endless path and driven by a powered sprocket drive (not shown) which drive within itself is not a part of the present invention. The drive sprocket is provided with split tooth forms 15, see FIG. 5, which engage behind the surfaces 17 of the flights on opposite sides of the linkages 12, and thus propel the flights and linkages.

The linkages comprise rigid, twist-resistant bars 12 usually although flexible bars may be used when desired, for example, when the path of the conveyor includes turns of such small radius as to require the bars to flex around the turns.

The flights 10 comprise a pusher assembly, see FIGS. 2 and 3, which includes two stiffener plates 18 and an intermediate plate 16. These three plates may each be solid or formed of numerous laminations and are provided with a common through hole 19 and are preferably fastened together for convenience in handling by a rivet, bolt or the like 20.

The plates 18 are usually formed of stome stiff material such as steel, aluminum or bronze, and the plate 16 is usually formed of some relatively flexible material such as rubber, artificial rubber, synthetic rubber, plastic; fabric impregnated with any desired elestic material; or spring metal such as spring steel, Phosphor bronze or stainless steel fabric. It is to be understood that the materials from which the plates 16 and 18 are formed are selected so as to impart whatever degree of flexibility or stiffness to the pusher assembly required by the nature of the material being handled. The plates 16 and 18 may be impervious or provided with openings to facilitate separation of solids from liquids or for any other desired purpose.

A supporting member preferably in the form of a threaded sleeve 24 having a bore 33 is positioned within the hole 19 in the pusher assembly so as to extend approximately equidistantly on each side. An internally threaded cap 22 is screwed onto each end of the sleeve 24 until it makes light contact with the pusher assembly. The two caps 22 serve to hold the pusher assembly in a generally central position but permit yielding rotation of the pusher assembly about the sleeve 24 against the friction provided by the inner ends of the caps 22 for a purpose to be described later. Each cap 22 is preferably provided with a hole 23 to enable a spanner wrench to be used in screwing the caps 22 onto the sleeve 24.

Each of the linkage bars 12 is provided on each end with a spherical head 28 which may be formed integrally with the bar 12 or formed separately and secured to the bar in any desired manner, such as swedging, welding or the like. A spherical bearing surface to coact with the spherical heads 28 is provided within the flights by means of split sleeves 26 which when the two halves are placed together form a cylinder on the outside which fits snugly within a bore 35 and abuts a shoulder 37 on the interior of each cap 22. The split sleeves 26 have hemispherical seats 45 formed on the inside which when the two halves are in position in the bore 35 of a cap 22 fit closely around a head 28 of a linkage 12 and form a universal socket for the head 28. When the caps 22 are screwed onto the sleeves 24 so as to lightly engage the plates 18 of the pusher assemblies, the socket formed by the split sleeves 26 is clamped tightly between the shoulder 37 of the caps 22 and the ends of sleeves 24 as shown in FIG. 2.

The sleeve 24 and caps 22 form a body member having hollow zones for the reception of the bearings 26 and heads 28.

Each of the caps 22 is provided with a circular groove 34 to receive a spring lock washer 32 which is split as shown in FIG. 3 to enable it to be compressed in diameter by squeezing around the periphery. An elastic sealing washer 30 formed of any desired elastic material is positioned within each cap 22 and abuts split sleeves 26 so as to effectively cover and seal the junction 31 between the sleeves 26 and the heads 28 regardless of the angular position of the linkages 12. When the spring lock washer 32 is compressed in any desired manner around the periphery and inserted in the open end of a cap 22, it first compresses the elastic sealing washer 30 tightly over the junction 31 and then expands so as to snap into the groove 34 and lock itself and the elastic sealing washer 30 securely in place. The opening through the spring lock washer 32 is preferably made larger than the opening in the elastic sealing washer 30 so as to permit maximum angular motion of the linkages 12 about their spherical seats 45 in any direction as shown in FIG. 2. When the linkage 12 contacts the elastic sealing washer 30 at the limit of a maximum angular movement, it compresses the washer 30 into even tighter sealing coverage over the junction 31.

It can be seen that the construction of the seal just described is such that pressure on the seal at either end of a flight 10 will not tend to disrupt the seal but instead compress the elastic sealing washer 30 into even tighter sealing relationship with the junction 31. Regardless of what direction the heads 28 may rotate in, the sealing washers 30 effectively squeege off all material on the heads 28 and prevent its entrance through the junctions 31.

A cylinder 25 provided with a bore 29 and formed of any desired lubricant resistant elastic material is positioned within the bore 33 of the threaded sleeve 24 and when the flight is in asembled conditon the heads 28 compress the cylinder 25 sufficiently to cause its elasticity to keep the heads 28 firmly seated in the sockets 45 at all times, even when there is no tension on the linkages 12, and thus prevent the entrance of any foreign material into the bearing sockets at any time while permitting swiveling movement of the heads 28 on the universal bearing seats 45.

The bore 29 in each cylinder 25 is filled with any desired lubricant, preferably of a semi-solid type, and each end of the cylinders 25 is provided with a radial groove 27 through which lubricant is constantly applied to the surfaces of the heads 28 so that lubricant is carried into the universal bearing seats 45 each time a linkage 12 partakes of angular movement while a flight is negotiating a turn. The elastic sealing washers 30 prevent any lubricant from leaving the bearing so that lubricant contamination of the material being carried is completely eliminated.

The preferred sequence of assembly of the flights 10 and linkages 12 is illustrated in FIG. 3. A head 28 of a linkage 12 is passed through the opening in an elastic sealing washer 30 which will expand to accommodate the head 28. A spring lock washer 32 is opened sufficiently to snap over the bar portion of the linkage in the relative position to the sealing washer 30 shown in FIG. 3. The head 28 is then passed through a cap 22 from the outer end of the cap 22 and two split bearing sleeves are placed around the head 28 which is then drawn back into the cap 22 so as to carry the split bearing sleeves 26 with it and seat them against the shoulder 37. A threaded sleeve 24 is then screwed into the cap until it tightly clamps the split sleeves 26 against the shoulder 37. The free end of the threaded sleeve 24 is then inserted in the through opening 19 in a pusher assembly 18–16–18. The bore 29 of a cylinder is then filled with lubricant and inserted within the opening 33 in the threaded sleeve. A second cap is then assembled with a linkage 12, head 28, sleeves 26, and washers 30 and 32 and this second cap is then screwed onto the free end of the threaded sleeve 24 until the split sleeves 26 are clamped tightly against the end of the threaded sleeve 24. At this point the pusher assembly 18–16–18 will be lightly held between the inner ends of the two caps 22 but can be rotated on the threaded sleeve 24 by slight force. Each of the elastic sealing washers 30 are then pushed into an adjacent end of a cap 22 and its respective spring lock washer is compressed, inserted into the end of a cap 22 against the sealing washer 30 and allowed to snap into its groove 34 to complete the assembly.

Successive assemblies are made to provide any desired length of flight linkage alternations desired.

It will be noted that any pusher assembly 18–16–18 can be removed by merely unscrewing the two adjacent caps 22, and any linkage 12 can be removed by merely unscrewing the two caps 22 which join it to the two adjacent flights 10. Thus any pusher assembly or linkage can be removed and replaced by unscrewing and screwing back only two elements.

Referring to FIG. 5, a section of tubular conveyor is shown wherein the tube or pipe 14 rises vertically, goes into a pipe bend to the left ninety degrees to the horizontal, and then goes through a roller or sprocket turn for ninety degrees to return to a vertical run. The flight-linkage articulation formed of the series of alternate flights and linkages travels through the pipe or tube 14 in the direction of the arrow. The pipe turn consists merely of a bend 46 in the pipe or tube and the roller or sprocket turn is formed of a drum 44 suitably mounted for rotation freely about its center in the case of a roller turn and provided with tooth forms 15 and suitably power driven in the case of a sprocket drive turn.

Referring to FIG. 4, it will be seen that the plates 18–16–18 have concentric portions near the through opening 19 which form a large common wear surface extending approximately from a point 40 around the periphery to a point 41. The construction described above in cooperation with the structure about to be described insures that contact between the flights and tube is restricted to the wear surface 38 at all times except for a very short distance between any two turns which require a change in the magnitude of approximately 130 or more degrees in the angular position of the surface 38 and on long runs where the weight of the flight-linkage articulation causes sufficient sag to bring the plate 16 into contact with the tube in the vicinity of the area 54 of plate 16 (see FIG. 4). In either event, as soon as the pressure between the tube wall and the plate 16 becomes sufficient to flex plate 16 even slightly, the wear surface 38 starts to rotate and rapidly moves into position to absorb the pressure temporarily carried by the plate 16 alone. This is brought about by the following structure and action:

The plates 18 are formed with a substantial straight edge 39 (see FIG. 4) terminating in a high point 42 which is displaced laterally from the central horizontal axis 43 of the flight 10 by a distance $x$ which can vary but is preferably not less than one quarter of the radius of plate 16.

When the contact between plate 16 and the tube occurs, if the contact is not generally in the area 54, the axis 43 of the flight must be to one side or the other of the dead center line 56. In which case the pull along axis 43 will seek the shortest path and cause pusher assembly 18–16–18 to rotate about the sleeve 24 and/or the entire flight to rotate about the heads 28 on the linkages and thus bring the wear surface into contact with the tube instead of letting the plate 16 carry the wear load alone.

When the contact between the plate 16 and the tube occurs, if the contact is generally in the area 54, the axis 43 of the flight must be near the dead center line 56. If the construction of the present invention were not present, the plate 16 could flex and scrub along on the tube for an indefinite time causing serious excessive wear. But with the structure of the present invention present, even slight flexure of plate 16 will be forced to be generally along the line 39 which will immediately create a predominant pressure point displaced from the center line 56 or dead center by a moment arm $x$ which will cause the pull along axis 43 to again rotate the pusher 18–16–18 and/or the flight in the direction of the arrow $y$ and thereby cause the wear surface 38 to absorb the wear away from the plate 16 alone.

An example of the action explained above is shown in FIG. 5. The flight 60 is just leaving the tube turn 50 and the roller or sprocket turn 48 is causing the axis 43 to be drawn upwardly towards the upper side 56 of the tube 14. This has caused the flight 62 to rise up from the bottom of tube 14 so as to bring its plate 16 into contact over the area 54 with the top 56 of the tube 14. Further movement will cause plate 16 to flex slightly and rotate the plate and/or the entire flight 62 until it moves approximately 90 degrees to the position of flight 64. Further movement will rotate flight 62 another 90 degrees to the position of flight 66 where the wear area 38 is again assuming the entire wear pressure and where the flight will remain until again forced out of that position by one of the conditions described above. This entire rotation of 180 degrees can take place in a very small distance 52 which can be in the magnitude of 12 inches due to the ease with which the pusher element 18–16–18 and its flight can rotate because of the rotating connection between the pusher element and its flight and the excellent swivel bearings provided by the heads 28 and their universal sockets.

When a turn such as 48 is located so as to direct the flight-linkage articulation to one side instead of up as shown in FIG. 4, the axially pull causes the pusher elements and/or flight to rotate gradually so as to reposition the wear surfaces 38 into proper position gradually without ever flexing the plates 16.

Whenever a large particle of the material being carried passes into the clearance area between the plate 16 and the tube 14, if it is between the points 40 and 41 measured counterclockwise, the plate 16 merely flexes and overrides the particle without causing stoppage or even appreciable increase in the tension in the flight-linkage articulation. If the particle enters between the points 40 and 41 measured clockwise, the entire flight raises while flexing the plate 16 on the opposite side and likewise bypasses the particle with little increase in the tension on the articulation. It will be noted that there is no point on the periphery of the plate 16 where a particle can not be bypassed, but at the same time the entire area of the plate 16 is sufficiently stiff to move material which is not lodged around the edges of the flight at all times and in any direction including the vertical.

The above description is by the way of illustration and not limitation since many changes and modifications can be made in the physical structure without departing from the spirit of the invention.

The invention having been described, what is claimed is:

1. A tubular material conveyor having a flight-linkage articulation in which a flight comprises a material pusher element having an opening therethrough, a tube disposed through said opening, a cap on each end of said tube to position the pusher element between them, a bearing having a hemispherical seat disposed within each cap with the seat facing inwardly of the tube, and in which a linkage comprises a link member having a spherical head on each end with each spherical head seated within a hemispherical bearing seat in a cap.

2. A tubular material conveyor flight-linkage articulation comprising an elongated hollow body open at both ends, a material pusher element mounted on said hollow body, a bearing having a hemispherical seat connected for retention within each end of said hollow body near the opening with the seat facing inwardly of the hollow body, a link member having a head with a spherical area seated within each bearing seat, and a seal mounted within each end of said hollow body exteriorly of the retention connection between the bearing and the hollow body so as to prevent any of the thrust pressure between the head and bearing from being carried by the seal and in position to at all times cover the outermost junction between the link member head and hemispherical bearing seat.

3. A tubular material conveyor flight-linkage articulation comprising an elongated hollow body open at both ends, a material pusher element mounted on said hollow body, a bearing having a hemispherical seat mounted within each end of said hollow body with the seat facing inwardly of said body, a link member having a head with a spherical area seated within each of said bearings, and an elastic compression element disposed within said hollow body between and in contact with said heads to forcibly retain said heads seated in their respective bearing at all times.

4. A tubular material conveyor flight-linkage articulation comprising an elongated hollow body open at both ends, a material pusher element mounted on said hollow body, a bearing having a hemispherical seat mounted within each end of said hollow body with the seat facing inwardly of said body, a link member having a head with a spherical area seated within each of said bearings, and a lubrication magazine disposed within said hollow body between and in contact with said heads.

5. A tubular material conveyor flight-linkage articulation comprising an elongated hollow body open at both ends, a material pusher element mounted on said hollow body, a bearing having a hemispherical seat mounted within each end of said hollow body with the seat facing inwardly of said body, a link member having a head with a spherical area seated within each of said bearings, and a combined lubrication magazine-compression element disposed within said hollow body between and in contact with said heads to retain them within their respective bearing seats and lubricate the bearings at all times.

6. A tubular material conveyor flight-linkage articulation comprising an elongated hollow body open at both ends, a material pusher element mounted on said hollow body, a bearing having a hemispherical seat rigidly connected to and within said hollow body near each end with the seat facing inwardly of said body, a link member having a head with a spherical area seated within each of said bearings, a lubrication magazine disposed within said hollow body between and in contact with said heads, and a seal mounted within each end of said hollow body on the exterior of the connection between the bearing and hollow body.

7. A tubular material conveyor pusher-linkage assembly comprising a body element having opposite ends and a cylindrically shaped area, a link member connected to each end of said body element, and a substantially circular material pusher element having a through opening eccentric to its center and mounted on said body element with the through opening surrounding the cylindrically shaped area to enable the pusher element to rotate about the body element.

8. A tubular material conveyor pusher-linkage assembly comprising a body element having opposite ends, link members, a swivel connection between each end of said body element and a link member, the swivel connections being on a common axis, and a material pusher element mounted on said body element with the geometric center of the pusher element displaced from the axis of the swivel connections.

9. A tubular material conveyor pusher-linkage assembly comprising a body element having opposite ends, link members, a swivel connection between each end of said body element and a link member, the swivel connections being on a common axis, and a material pusher element having an enlarged wear surface extending over part of its periphery mounted on said body element with its geometric center displaced from the axis of the swivel connections.

10. A tubular material conveyor pusher-linkage assembly comprising a body element having opposite ends, link members, a swivel connection between each end of said body element and a link member, the swivel connections being on a common axis, and a pusher element mounted on said body element with the geometric center of the pusher element displaced from the axis of the swivel connections, the said pusher element having an enlarged wear surface extending over its periphery near to said body element.

11. A tubular material conveyor pusher-linkage assembly comprising an elongated body, a link member connected to each end of said body, and a material pusher element having a peripheral edge section part of which is flexible and part of which is rigid mounted on said body member with the rigid part of the peripheral edge section embracing said body member.

12. A tubular material conveyor pusher-linkage assembly as claimed in claim 11 wherein said pusher element is rotatably mounted on said body.

13. A tubular material conveyor pusher-linkage assembly comprising a body element having opposite ends, a link member connected to each end of said body element, a material pusher assembly mounted on said body element, said pusher assembly comprising a rigid member and a juxtaposed flexible member having an area extending beyond the periphery of the rigid member, the thickness and flexibility of said extending area being such that said extending area can bend relative to the rigid member, and said rigid member having an edge section extending transversely of said body element along which said extending area bends during flexure.

14. A tubular material conveyor pusher-linkage assembly comprising a supporting member, a pusher element on said supporting member, a hollow cap on said supporting member having an opening therein, a substantially circular bearing formed in two semi-circular parts having a hemispherical seat disposed in said cap with the seat facing inwardly of said cap, and a link having an enlarged head having a spherical area with the spherical area seated in said hemispherical bearing seat, the diameter of said spherical area of the enlarged head being smaller than the smallest cross dimension of the opening in said cap.

15. A tubular material conveyor comprising a casing, articulated pusher-linkage assemblies disposed in said casing for travel therethrough longitudinally of the casing, a powered drive for propelling said pusher-linkage assemblies, each of said pusher-linkage assemblies comprising a body element having opposite ends, link members, a swivel connection between each end of said body element and a link member, the swivel connections being on a common axis, and a pusher element mounted on said body element with the geometric center of the pusher element displaced from the axis of the swivel connections, whereby when the casing changes direction the body element can rotate about said swivel connections to enable the pusher-linkage assemblies to travel the shortest path through the casing.

16. A tubular material conveyor comprising a casing, articulated pusher-linkage assemblies disposed in said casing for travel therethrough longitudinally of the casing, a powered drive for propelling said pusher-linkage assemblies, each of said pusher-linkage assemblies comprising a body element having opposite ends and a cylindrical section, link members, a swivel connection between each end of said body element and a link member, the swivel connections being on a common axis, a pusher element having a through opening with its geometric center displaced from the geometric center of the pusher element, the pusher element being mounted on said body element with the through opening surrounding the cylindrically shaped section and concentric with the swivel axis, whereby when the casing changes direction the body element can rotate about the swivel connections and the pusher element can rotate about the body element to enable the pusher-linkage assemblies to travel the shortest path through the casing.

17. A tubular material conveyor as claimed in claim 16 further characterized by said pusher element having a peripheral edge section part of which is flexible and part of which is rigid.

18. A tubular conveyor as claimed in claim 17 further characterized by said pusher element having an enlarged wear surface on the rigid part of its periphery.

19. A tubular conveyor as claimed in claim 17 further characterized by means reinforcing said pusher element to confine flexure to an area which is eccentric to the geometric center thereof.

20. A pusher-linkage assembly for material conveyors comprising a body member having opposite ends and a hollow zone near each end, walls disposed over the ends of said body member with an opening in each wall, a material pusher element disposed on said body member, a bearing member having a spherical seat with an opening into said seat positioned in said hollow zone inside each of said walls with the opening adjacent to the wall opening, the smallest cross dimension of said wall opening being larger than the smallest cross dimension of said bearing opening, said bearing member being split so as to divide said spherical seat into sectors, link members each comprising an elongated section having an enlarged head on each end having a spherical area, the largest dimension of each enlarged head being measured crosswise of said elongated section smaller than the smallest cross dimension of said wall opening and larger than the smallest cross dimension of said bearing opening, each link member being positioned with a spherical area of a head seated in the seat of a bearing member with the elongated section extending out through said bearing and wall openings.

21. A pusher-linkage assembly for material conveyors comprising a hollow body member having opposite ends, a removable wall having an opening therein connected to at least one of said ends, a material pusher element attached to said body, a bearing element with an opening therein having a partial spherical wall providing a spherical bearing seat positioned inside of said wall with the opening adjacent to said wall opening, the smallest cross dimension of said wall opening being larger than the smallest cross dimension of said bearing opening, said bearing element being split so as to divide said bearing seat into sectors, a link member comprising an elongated section with an enlarged head having a spherical area, the largest cross dimension of said enlarged head being smaller than said smallest cross dimension of said wall opening and larger than said smallest cross dimension of said bearing opening, and said link member being positioned with said spherical area seated in said bearing seat with the elongated section extending out through said bearing and wall openings.

References Cited by the Examiner

UNITED STATES PATENTS

| 499,525 | 6/93 | Dodge | 198—176 |
|---|---|---|---|
| 2,756,866 | 7/56 | Wilde | 198—168 |
| 2,885,719 | 5/59 | Nordmark | 287—21 |
| 3,066,963 | 12/62 | Vogt | 287—87 |

FOREIGN PATENTS

| 762,411 | 11/56 | Great Britain. |
|---|---|---|
| 276,734 | 8/30 | Italy. |

SAMUEL F. COLEMAN, *Primary Examiner.*

WILLIAM B. LABORDE, ERNEST A. FALLER,
*Examiners.*